United States Patent

[11] 3,631,720

[72] Inventors Berel Weinstein
New York, N.Y.;
Zsigmond L. Sagi, Parsippany, N.J.
[21] Appl. No. 868,410
[22] Filed Oct. 22, 1969
[45] Patented Jan. 4, 1972
[73] Assignee Bio-Medical Sciences, Inc.
New York, N.Y.

[54] DISPOSABLE THERMOMETER
1 Claim, 6 Drawing Figs.
[52] U.S. Cl. ............................................. 73/358
[51] Int. Cl. ....................................... G01k 11/08
[50] Field of Search ................................. 73/358;
116/114.5

[56] References Cited
UNITED STATES PATENTS
2,379,459 7/1945 Schreiber.................... 73/358

| | | | |
|---|---|---|---|
| 2,614,430 | 10/1952 | Ballard........................ | 73/358 |
| 3,175,401 | 3/1965 | Geldmacher................. | 73/358 |
| 3,430,491 | 3/1969 | Gignilliat..................... | 73/358 |
| 3,465,590 | 9/1969 | Kluth............................ | 73/358 |

*Primary Examiner*—Louis R. Prince
*Assistant Examiner*—Denis E. Corr
*Attorney*—Irving Seidman ABSTRACT: A disposable clinical thermometer for single usage which includes a carrier layer and a plurality of individual temperature-indicating elements distributed over at least one surface of the carrier layer; each element having a temperature indicating marking thereon and a fuseable organic material coating normally concealing the marking, but fuseable at a predetermined temperature, the fuseable material being displaceable to expose the marking to view.

PATENTED JAN 4 1972

3,631,720

INVENTOR.
BEREL WEINSTEIN
BY ZSIGMOND L. SAGI

Irving Seidman
ATTORNEY.

DISPOSABLE THERMOMETER

BACKGROUND OF THE INVENTION

Temperature-indicating devices have been proposed for clinical and other purposes, which are of the single usage, disposable type. Said known devices are of relatively complex construction, expensive to manufacture and somewhat nonuniform in their operation.

Accordingly, an object of this invention is to provide an improved disposable thermometer construction, particularly for clinical use, which shows a high degree of temperature-indicating accuracy; is of minimal size and convenient to use; is readily disposable after use; and is of a simple, inexpensive construction.

Another object of this invention is to provide an improved disposable thermometer of the character described, which comprises a thin flexible carrier member upon which is located a set of spaced temperature indicating elements arranged in a predetermined spacing pattern and in conjunction with a series of temperature-indicating numerals for providing temperature readings at 0.2° F. intervals; each of the temperature-indicating elements including a thin disc of impervious material carrying a marking on one side thereof with a fuseable coating enveloping the disc and normally concealing the marking; the coating having a critical melting point whereby fusion of such coating will be effective to reveal the marking.

Other objects of this invention will in part be obvious and in part hereinafter pointed out.

DESCRIPTION OF THE PREFERRED EMBODIMENT

Figures 1, 2, 3:
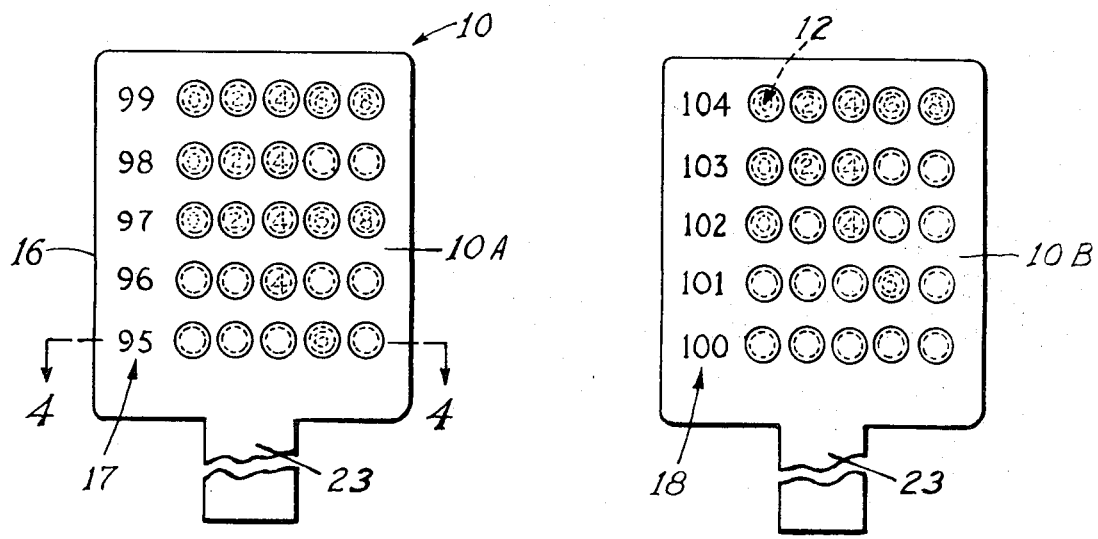
FIG. 1 is an end elevational view of a disposable thermometer embodying the invention.
FIG. 2 is a diagrammatic showing of the top view thereof.
FIG. 3 is a diagrammatic showing of the bottom view thereof.
Figure 4:
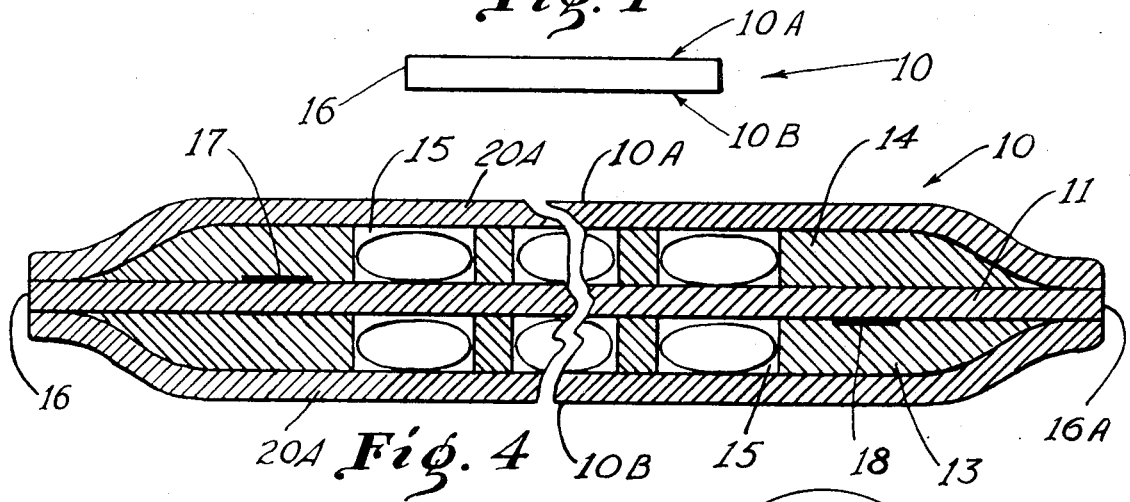
FIG. 4 is a sectional view taken on the line 4—4 of FIG. 2.
Figure 5:
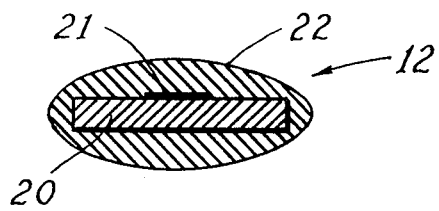
FIG. 5 is a transverse sectional view of a single temperature indicating element.
Figure 6:
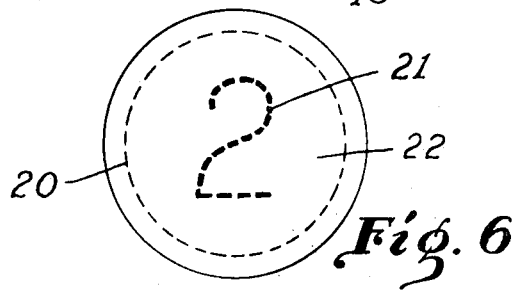
FIG. 6 is a top plan view thereof.

As shown in the drawing a disposable clinical thermometer embodying the invention is generally indicated at 10. The same comprises a thin flexible rectangular member having opposite surfaces 10A, 10B. Such device is of minimal dimensions and may be of the order of about 0.625 inch by 0.75 inch. The same is readily inserted in the mouth to ascertain clinical temperatures.

The device 10 comprises a thin carrier sheet 11 of Mylar, cellulose acetate, or the like. A set of temperature indicating elements generally shown at 12 are arranged in rows on each side of the carrier sheet 11. The elements 12 are located in proper array by way of a pair of perforated sheets 13, 14 adhesively secured to the opposite sides of carrier sheet 11, thus the sheets 13, 14 have rows of perforations 15 to receive elements 12 therein.

The elements 12 are adapted to respectively register the specific temperatures at successive 0.2° F. intervals. For example, between 95° and 104.8° F. there will be required a total of 50 elements 12 which are distributed in groups of 25 on each of the sides 10A and 10B of the device. Conveniently the elements 12 are arranged in five rows of five elements each. For temperature indicating purposes, the carrier sheet 11 is imprinted on surface 10A thereof with the temperature values 95 to 99 inclusive adjacent one side edge 16 as the vertical column indicated at 17, and with the temperature values of 100 to 104 inclusive on the other surface 10B thereof, adjacent edge 16A, as at 18.

Each of the temperature indicating elements 12 comprise a small thin disc 20 of transparent cellophane or other impervious material. The disc 20 are imprinted on one side thereof, as at 21, with the numerals 0, 2, 4, 6 and 8 respectively, for indicating the 0.2° F. intervals for each of the whole temperature values of 95° to 104° F.

The individual imprinted discs 20 are dipped in a series of molten, nontoxic, organic material having precise melting points to form the enveloping cover 22. The organic materials are particularly selected to cover a range of melting points from 95.0° to 104.8° F. Such materials may include:

| | |
|---|---|
| 4-phenoxy butyl bromide | 1-indanone |
| 4-bromoisoquinoline | 3,5 dimethoxy phenol |
| menthol | 1-bromo, 2-nitrobenzene |
| piperonal | 3,3,5 methyl cyclohexanol |
| benzyl cinnamate | 2 (dibenzylamino) ethanol |
| 1,6 hexane diol | 3,4 dichloro benzaldehyde |
| 3,3 dimethoxy biphenyl | p-diethylamino benzaldehyde |
| 2, nitro biphenyl | o-anisaldehyde |
| hydroxy benzophenone | 2-chloro 6-nitrotoluene |

The foregoing organic materials are of a crystalline nature and are highly purified by repeated crystallizing operations from appropriate solvents. Such crystallizing operations insure precise melting points for the respective materials with minimal deviations therefrom. In some instances, two or more of the organic materials may be cocrystallized in order to achieve desired specific melting points.

It will be apparent that the elements 12 will be selectively disposed in the appropriate perforations 15 on the opposite sides 10A, 10B of device 10, and in alignment with the imprinted numerals 95 to 104 inclusive, so as to, in effect, provide for successive readings of temperature values, e.g. 95.0, 95.2, 95.4, 95.6, 95.8, etc.

The elements 12 are retained in place in perforations 15 by transparent cover sheets 20A of cellophane or the like overlying the perforated sheets 13, 14 and sealed to the carrier sheet 11 about the marginal edges thereof. The coatings 22 as applied to the individual discs 20 are of a transparent character. Accordingly, the devices 10 are passed through pairs of opposed crushing rollers, which are effective to powder the coatings 22 somewhat, making the same opaque and concealing the imprinted FIGS. 21 thereof. The devices 10 may be provided with tabs 23 for handling and insertion purposes.

In using the device 10 the same is placed in the mouth and retained therein for a time sufficient to register the temperature by virtue of melting the coatings 22 of the individual elements 12 in a range of temperatures up to and including the temperature of the individual using the device 10. Upon melting the material 22 the fused material tends to be laterally displaced and to thereby expose the imprint 21 thereon, thus upon removing thermometer device 10 from the mouth of the user, a quick examination of the opposite sides 10A, 10B thereof will reveal the highest temperature value thereon, which will be a measure of the clinical temperature of the user.

It will be apparent that the device 10 being of minimal size may be readily used and quickly disposed after such use. Further, the device may be available in roll form with each unit 10 being available by tearing the same along perforated separation lines between succeeding units.

Alternatively, the individual devices 10 may be carried in separate sterilized cellophane containers, not shown, thus such containers may be readily opened and the thermometer extracted therefrom for use at the appropriate time.

We claim:

1. A disposable clinical thermometer comprising a flat carrier member, a plurality of temperature indicating elements on at least one surface of said carrier member, means for maintaining said elements in a spaced pattern relation to each other, and a transparent cover sheet overlying said elements, each of said elements comprising an impermeable base member, indicia on one surface of said base member, and an opaque coating of fuseable organic material over said base member and concealing said indicia, said coating being fuseable at a predetermined temperature and displaceable to expose said indicia to view through said cover sheet, said temperature indicating element comprising a thin disc of cellophane, a numeral being imprinted on one surface of said disc, said disc being enveloped in an opaque coating of fuseable crystalline organic material.